United States Patent [19]

Kersting

[11] Patent Number: 4,810,457

[45] Date of Patent: Mar. 7, 1989

[54] METHOD OF BLOW MOLDING ON THERMOFORMING A PLASTIC HARDSKIN/SOFTCORE MULTILAYER SHEET MATERIAL

[75] Inventor: R. James Kersting, Houston, Tex.

[73] Assignee: Rampart Packaging Inc., Williamsburg, Va.

[21] Appl. No.: 101,890

[22] Filed: Sep. 28, 1987

[51] Int. Cl.4 .................. B29C 49/22; B29C 49/20; B29C 51/14; B29C 51/12
[52] U.S. Cl. ................... 264/544; 264/322; 264/553
[58] Field of Search ............... 264/544, 138, 322, 553

[56] References Cited

U.S. PATENT DOCUMENTS

| | | | |
|---|---|---|---|
| 3,719,735 | 3/1973 | Valyi | 264/544 X |
| 4,234,536 | 11/1980 | Thiel et al. | 264/544 X |
| 4,424,182 | 1/1984 | Cerny | 264/138 |

*Primary Examiner*—Philip Anderson
*Attorney, Agent, or Firm*—Donald F. Haas

[57] ABSTRACT

A process is disclosed for thermoforming a sheet or billet comprised of at least one outer layer of polypropylene and at least one adjacent layer of a random copolymer of propylene and ethylene and, optionally, a barrier layer. The sheet or billet is thermoformed into rigid articles which do not significantly distort under retort conditions by forming the sheet or billet at a temperature below the sticky point of the polypropylene layer and above the sheet distortion temperature.

11 Claims, 1 Drawing Sheet

HARD SHARD SKIN/SOFT CORE APPROACH

FIG.1 HARD SHARD SKIN/SOFT CORE APPROACH
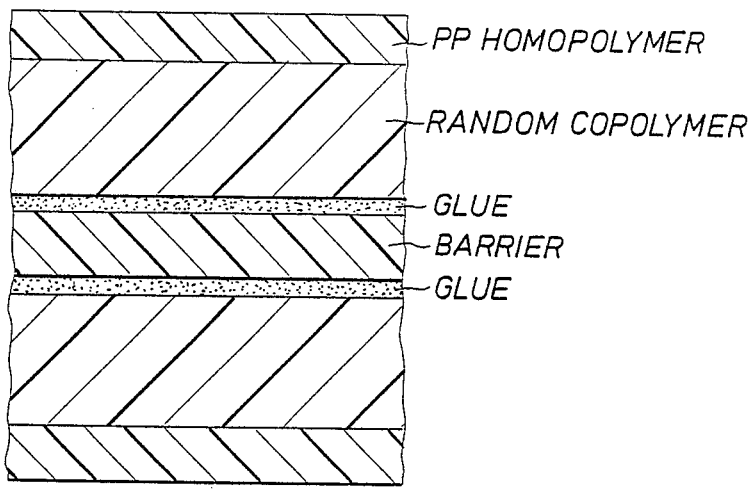
FIG.2 FAIL/PASS TRANSITION IN 275°F DISTORTION TEST FOR 50 MIL HARD SKIN-SOFT CORE SHEET ILLIG LAB FORMER/600°F OVEN
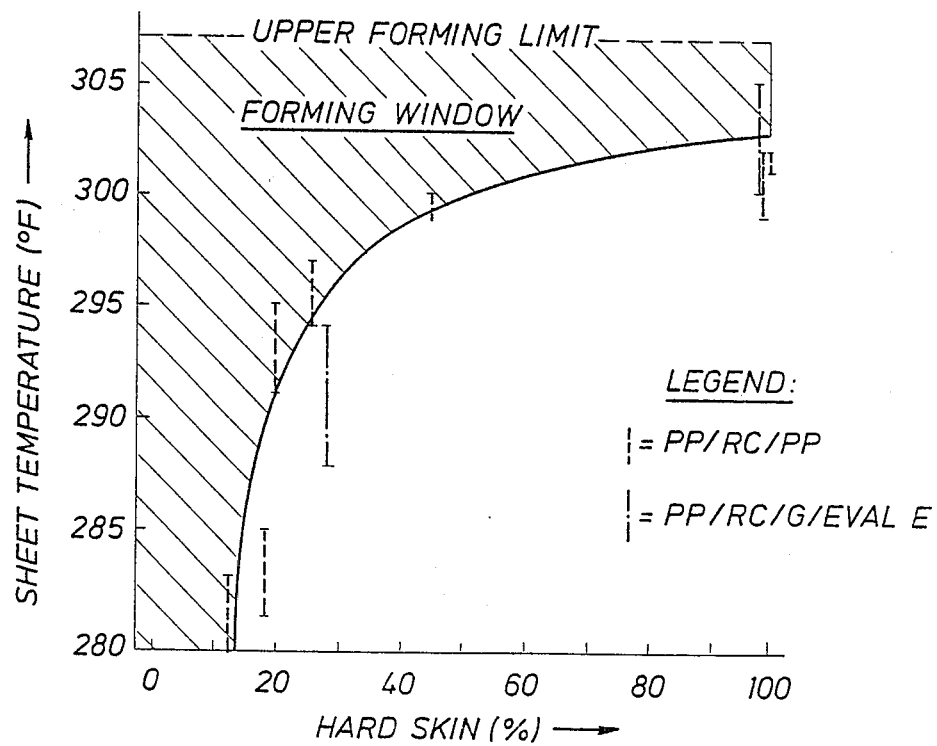

METHOD OF BLOW MOLDING ON THERMOFORMING A PLASTIC HARDSKIN/SOFTCORE MULTILAYER SHEET MATERIAL

FIELD OF THE INVENTION

This invention relates to a process for forming rigid packages which exhibit minimum distortion under retort conditions. More particularly, the invention relates to a process of thermoforming a sheet or a billet which has an outer polypropylene layer and a layer of a random copolymer of propylene and ethylene.

BACKGROUND OF THE INVENTION

In the 1980's there has been an explosion of new plastic containers in the marketplace. Many of these containers are made from polyolefins such as polypropylene and polyethylene because of their relatively low cost, good heat sealability and relatively high moisture resistance. However, these polyolefins exhibit a fairly high permeability to gases, including oxygen, so that, used alone, they are not adequate for packaging oxygen-sensitive foods and other materials that degrade in the presence of oxygen.

To impart oxygen impermeability to polyolefin packages, various barrier materials, such as ethylene vinyl alcohol copolymers, vinylidene chloride and nylon are used in multi-layer laminates. Such laminates are well known and have been the subject of many patents. Containers can be formed directly from large sheets of these materials, or, alternatively, individual billets may be used instead of sheets.

It is recognized that to achieve significant market acceptability, such packages or containers must be able to withstand heating without significant distortion. The ability to "hotfill" packages or to retort foods after they have been packaged permits the foods to be stored without refrigeration. Commercial sterilization by hotfilling or retorting imposes several additional restrictions on the choice of materials for the package: (1) the heat seal must survive commercial sterilization temperatures of over 180° F. or typical retort conditions of steam or water at 250° F. or more under pressure for one half hour or more; (2) the structure must not delaminate, unduly shrink or wrinkle as a result of the sterilization; (3) the oxygen and water barrier properties must not be permanently adversely affected by the conditions of commercial sterilization; and (4) the structure must be adequately strong to permit the handling of the package while still hot. The need for these additional hotfilling or retorting requirements rules out many of the materials and structures commonly used for non-retorted film or sheet food packages.

One very successful method of forming polymers below the melting point of the polymer is offered by Shell Oil Company and is called solid phase pressure forming (SPPF). In the SPPF method, manufacturers work with polyolefins below their melting point. The process begins with polyolefin pellets which are extruded into sheet 0.25 to 2 mm thick, depending upon the application. The sheet is fed through a radiant heating unit and then to the thermoformer which produces finished containers and other parts. Since in the SPPF process the part is formed at a temperature below the polyolefin melting point, accurate heating control is required to produce sheet uniformly heated below the melting point for satisfactory forming. The heated sheet is clamped over a mold cavity. A forming plug then pushes the sheet towards the bottom of the cavity while air pressure forces the sheet over the contours of the mold. The newly formed shape cools almost instantly and becomes rigid enough for trimming in place or in a subsequent downstream trim operation. The remaining web is then ground for recycling. Representative of patents dealing with the SPPF process include U.S. Pat. Nos. 3,859,028; 3,499,188; 3,606,958; 3,546,746; 3,532,786; 3,642,415; 3,757,718 and 4,172,875.

Another method of forming polymers below the melting point of the polymer is described by the Budd Company in U.S. Pat. No. 4,014,970. Still another solid phase process is described and is referred to as a scrapless forming process. This process is Dow Chemical Company's process and is described in U.S. Pat. Nos. 3,739,052; 3,947,204; 3,995,736 and 4,005,967. In these processes, a plastic blank approximately equal in weight to the finished plastic container is cut from sheet stock material and processed by high pressure techniques to form the desired container. Ball Corporation employs a blank or billet solid phase process, as exemplified in U.S. Pat. Nos. 4,286,000 and 4,419,412.

Polyolefin, especially polypropylene, containers formed under typical solid phase forming conditions are highly oriented resulting in increased stiffness, impact strength and clarity. These are desirable qualities but orientation can be detrimental in some applications. When oriented polypropylene food containers are exposed to high temperatures, such as in a retort process, the orientation in the polymer relaxes and causes unacceptable container distortion. Problems with stress relaxation do not occur if the polymer is formed under melt phase conditions because the polymer does not become as extensively oriented. The objective of the hardskin/softcore approach of the present invention is to enable the sheet or billet to behave in the process machinery like a solid but to form as if it were in the melt phase.

SUMMARY OF THE INVENTION

This invention relates to a process for thermoforming a sheet or billet which is comprised of at least one outer layer of polypropylene and at least one layer of a random copolymer of propylene and ethylene in which propylene is the major component so that the two layers are compatible and will adhere to each other easily. These layers, optionally combined with a layer of a barrier material, are formed into rigid articles which do not significantly distort under conditions by forming the sheet or billet at a temperature below the sticky point of the polypropylene layer and above the highest temperature at which the copolymer layer will not be able to prevent stress relaxation in the polypropylene layer from causing significant distortion of the articles under retort conditions.

It is preferred that the thickness of the copolymer layer be at least four times the thickness of the polypropylene layer. If this relationship is satisfied, then successful thermoforming according to this invention can be carried out in the widest possible temperature range. It is also preferred that a mineral filler be incorporated into the copolymer layer to increase its high temperature stiffness for better thermoforming results.

BRIEF DESCRIPTION OF THE DRAWINGS

FIG. 1 shows a laminate made according to the present invention.

FIG. 2 is a graph of the data from Example I illustrating the forming window.

FIG. 3 is a graph of the data from Example III illustrating the forming window.

FIG. 4 is a graph of the data from Example IV illustrating the forming window.

DETAILED DESCRIPTION OF THE INVENTION

As stated above, solid phase thermoformed polypropylene containers typically have high levels or orientation. Under conditions of food retorting, the orientation relaxes, resulting in unacceptable container distortion. The objective of this invention is to thermoform polypropylene based retortable containers in the solid phase so that the sheet or billet will behave as a solid in the forming phase but will be formed as if it were in the melt phase.

This seemingly inconsistent objective is achieved by the utilization of a two layer outer skin for the article to be formed. Under normal circumstances, there is simply one layer of polypropylene which is the outer protective layer for the article. In the present invention, there is needed an outer layer of polypropylene and an adjacent layer of a random copolymer of propylene and ethylene in which propylene is the major component so that the two layers are compatible and will easily adhere to each other. This sheet structure then contains a higher melting outer skin of polypropylene covering a lower melting layer of a propylene/ethylene random copolymer. In most applications, there will be an adhesive and barrier layer below these two layers. One example of a laminate according to the present invention is shown in FIG. 1.

The basic premise of the invention is that the hardskin/softcore construction of the present invention is heated to a temperature such that the outer polypropylene skin remains a non-sticky solid while the inner random copolymer layer is molten. Since it is formed in the melt phase, the random copolymer layer is not extensively oriented and is not subject to stress relaxation causing distortion under retort conditions. The copolymer layer must be sufficiently thick to prevent the stress relaxation forces in the polypropylene from causing unacceptable distortion in the thermoformed container. Thus, there exists a "forming window" within which acceptable containers can be made. This forming window exits below the sticky point of the polypropylene, i.e. the temperature at which the polypropylene becomes tacky and sticks to itself and the forming equipment. Articles formed at this temperature are very difficult to properly form because: (1) the plastic sheet tends to droop or sag in the oven and (2) an uneven distribution of wall thickness almost always occurs. The lower limit of the forming window is related to the amount of orientation in the polypropylene, i.e. the higher the forming temperature, the lower the amount of orientation and vice versa. The relative thickness of the copolymer layer needed to prevent the stress relaxation in the polypropylene layer from causing unacceptable distortion in the formed article is directly related to the amount of orientation in the polypropylene layer. As the amount of orientation increases (at lower forming temperatures), the ratio of the thickness of the copolymer layer to the thickness of the polypropylene layer must also increase if an acceptable container is to be obtained.

The stress relaxation of the polypropylene layer can cause unacceptable distortion in a number of ways, such as high shrinkage, wrinkling, puckering, uneven tops and bottoms, etc. One important criterion for an acceptable container is that both the top and bottom of the container must sit flat on a flat surface. If either the top or the bottom of the container do not sit flat on a flat surface, then the amount of distortion is unacceptable. Also, the sidewalls of the container will tend to bow inward. If this bowing is too great, the consumer acceptance of the package will be adversely affected and thus the distortion is unacceptable. Shrinkage tests can be performed on containers formed according to the present invention by measuring the change in the amount of liquid which can be placed in the container both before and after subjecting the container to retort conditions. It has been found that the other subjective tests for unacceptable distortion have a close correlation to the more objective shrinkage method of testing for unacceptable distortion. If the amount of shrinkage is 6% or less, then the container will most probably be completely acceptable. If the shrinkage is between 6 and 8%, then the container may be marginally acceptable. If the shrinkage is greater than 8%, then the container will most probably be unacceptably distorted.

The boundaries of the forming window depend upon the particular forming machine, the size of container, speed of heating, materials, etc., and must be determined experimentally. The upper temperature forming limit corresponds closely with the sticky point of the polypropylene. A test for the sticky point is the temperature at which the sheet welds to itself. This temperature will vary with the heating rate of the sheet but it should be relatively constant for any one particular set of materials and conditions.

It is a little more difficult to determine the lower temperature limit. It is the lower forming temperature which primarily controls the breadth of the forming window. The experimental procedure for determining the lower forming temperature limit involves forming containers at progressively increasing sheet temperatures and testing for cup distortion. Of course, changing the ratio of the thickness of the copolymer layer to the thickness of the polypropylene layer will affect the lower forming temperature. Other factors which will also affect it are draw ratio, sheet thickness and the rate of heating. These factors, as well as the compositions of the materials, should be kept constant while varying the different amounts of the materials and the forming temperature so that a curve representing the lower forming temperature at all possible ratios of homopolymers and copolymers can be obtained. Such curves are shown in FIG. 2, FIG. 3 and FIG. 4. The forming window is the area above the curve but below the sticky point of the polypropylene. It can be seen that the forming window is much broader when the thickness of the polypropylene layer is ¼ or less of the thickness of the copolymer layer. Thus, it is preferred to operate in this region because the control of the forming temperature is not quite as important and difficult to achieve.

"Puckering" is a distortion phenomena which can take place under retort conditions in containers made according to the present invention. It has been found that puckering can be eliminated and high temperature stiffness increased by incorporating a mineral filler into the random copolymer layer. Fillers such as mica, talc, clays and calcium carbonate can be used effectively at levels of 20 to 40%. Platy fillers, i.e. fillers having a high aspect ratio are especially effective.

Polypropylene homopolymers are preferred as the polypropylene for use in the present invention. However other polypropylenes such as copolymers of propylene and very small amounts of other monomers can also be used. The melting point of the outer polypropylene skin should be at least about 10° C. higher than the melting point of the adjacent random copolymer. The minimum acceptable melting point of the random copolymer will be determined by the end use requirements of the application. For retortable containers the random copolymer must retain sufficient strength to undergo the particular retort process. The random copolymers of propylene and ethylene which are useful in the present invention include those in which propylene is the major component. Generally, the melting point of the copolymer can range from about 140° C. to about 150° C.

The thermoforming processes contemplated herein may include plug molding, vacuum molding with plug assist, stamping and the like. A preferred process is a modified SPPF process where the temperature of the sheet or billet is controlled according to the present invention. In general, the modified SPPF process comprises placing a sheet or billet of the plastic material within the control temperature range on the opening of a molding cavity, clamping the sheet in a clamping device, lowering a plug of the desired configuration onto the sheet or billet and into the molding cavity whereby material of the sheet or billet is drawn into the cavity, and supplying fluid pressure (e.g., air) between the plug and the drawn sheet whereby the sheet is pressed against the walls of the mold cavity to form the hollow articles.

As essential part of the present invention is the temperature control of the plastic sheet or billets during the thermoforming process. The other conditions for thermoforming, such as pressure, residence time, type of machinery and the like may be determined by one skilled in the art of thermoforming or stamping by reference to the various patents cited herein and elsewhere.

To illustrate the present invention, the following illustrative embodiments are given. It is understood that the embodiments are given only for purposes of illustration and the invention is not to be regarded as limited to any of the specific materials or conditions used in this specific embodiments.

EXAMPLE I

First, the upper limit of the forming window as determined by finding the sticky point of the polypropylene resin used which had a melt flow rate of 2 grams/10 minutes. The sticky point was determined by placing the polypropylene sheet in a radiant oven set at either 450° F. or 700° F. The sheet was heated for varying periods of time until the sheet became self sticking. It can be seen by looking at Table 1 that the sticky point of the polypropylene is much lower when the oven temperature is higher and the heating rate is faster.

TABLE 1

PP SELF ADHESION TEMPERATURE VS. HEATING RATE

| Lab Former Oven Temp. | Typical Time in Oven | Sheet Temp. Self Sticking? | |
|---|---|---|---|
| | | No | Yes |
| 700° F. | 0:45 min. | 303° F. | 308° F. |
| 450° F. | 4:30 min. | 325° F. | 330° F. |

In the first set of experiments, a series of 50 mil three layer sheets were extruded. These sheets consisted of a polypropylene/random copolymer/polypropylene structure. In one construction, a mica-filled random copolymer was used. Sheet with a 50 mil gauge readily formed in the Illig Lab former used in these experiments. The proportion of hardskin (polypropylene) to softcore (random copolymer) was a variable while monolayer polypropylene sheet was used as a control. A second set of experiments were performed with 50 mil gauge barrier constructions.

Two propylene/ethylene random copolymers were used as the softcore material. The ethylene content of these polymers determines the copolymer melting point. Thus, for the concept of the present invention to work, the random copolymer must be effectively melted before the polypropylene outer layer becomes tacky. The lower temperature limits of the random copolymer melting are determined by the required stiffness of the container at retort temperatures. Random copolymer 1 contained 3.2% ethylene and had a 144° C. melting point and a melt flow rate of 2 g/10 min. and random copolymer 2 contained 3.8% ethylene and had a 140° C. melting point and a melt flow rate of 4 g/10 min. Both of these copolymers exhibited total melting before the peak melting point of the polypropylene utilized. The barrier material utilized in the latter set of experiments was an ethylene vinyl alcohol copolymer (EVAL ®E) which is described as having a melt index of 5.5 g/10 min. and an ethylene content of 38% mole. The melting point of EVAL ®E was 167° C.

A large number of sheets having varying proportions of the polypropylene and random copolymer layers were thermoformed at different temperatures within the expected forming range. 4 oz. cups were made and subjected to retort conditions. A determination of whether or not there was unacceptable distortion was made subjectively based on the tests of whether or not the top and bottom of the container sat flat on a flat surface and whether or not the sidewalls of the containers were unacceptably bowed. By analyzing the data, the temperature above which the container would pass was determined as well as the temperature below which the container would fail. The results of the experiments without the barrier material are shown in Table 2. It can be seen that an additional variable of radiant oven temperature was used and that similar results were obtained at both temperatures.

TABLE 2

275° F. RETORT SIMULATION TEST ON 4 OZ. CUPS FORMING TEMPEATURE FOR NOMINAL 50 MIL PP/RC/PP SHEET

| Ref. No. | Sheet Compositions | % Hard Skin | Radiant Oven Temp. | |
|---|---|---|---|---|
| | | | 600° F. | 450° F. |
| | | | Fail Pass | Fail Pass |
| 2 | 5384 monolayer[2] | 100% | 301/302 | 302/306 |
| 1 | 5384 monolayer | 100% | 299/302 | |
| 4 | 5384/6-148/5384 | 25% | 294/297 | 294/298 |

TABLE 2-continued

275° F. RETORT SIMULATION TEST ON 4 OZ. CUPS FORMING TEMPEATURE FOR NOMINAL 50 MIL PP/RC/PP SHEET

| Ref. No. | Sheet Compositions | % Hard Skin | Radiant Oven Temp. 600° F. Fail Pass | Radiant Oven Temp. 450° F. Fail Pass |
|---|---|---|---|---|
| 3 | 5384/6-148/5384 | 21% | 291/295 296/298 297/301 | 290/292 |
| 5 | 5384/6-148/5384 | 18% | 281/285 | 292/295 |
| 6 | 5384/6-148 + 34% WG-1/5384[1] | 12% | —/283 | 291/295 |
| 7 | 5384/6-151/5384 | 17% | 279/281 | 284/288 |

[1]WRS 6-148 filled with 34% Huber WG-1 mica.
[2]5384 = PP, 6-148 = RC 1, 6-151 = RC 2.

In Table 2, reference numbers one and two were monolayer polypropylene sheet and reference numbers 3, 4 and 5 were three layer sheet comprising polypropylene/random copolymer one/polypropylene. Reference number 6 utilized random copolymer one containing 34% mica. Reference number 7 was polypropylene/random copolymer two/polypropylene.

The temperatures shown indicate the highest forming temperature at which the cup made from the particular construction failed and the lowest temperature at which the particular cup formed passed. It can clearly be seen that the use of the random copolymers in a three layer laminate substantially lowers the sheet distortion temperature, i.e. the temperature at which a cup formed from such a sheet will fail the retort test. Since the sticky point is constant, the forming window has been broadened.

window. The forming window is broadest when the percentage of polypropylene is 20% or less.

TABLE 3

275° F. RETORT SIMULATION TEST ON 4 OZ. CUPS FORMING TEMPERATURE FOR NOMINAL 50 MIL PP/RC/G/E . . . SHEET

| Ref. No. | Sheet Composition | Hard Skin | Radiant Oven Temp. 600° F. Fail Pass | Radiant Oven Temp. 450° F. Fail Pass |
|---|---|---|---|---|
| 9 | 5384/QF551/EVAL ® E[1] . . . | 100% | 300/305 | 303/306 |
| 11 | 5384/6-148/QF551/EVAL ® E . . . | 46% | 299/300 | 300/304 |
| 12 | 5384/6-148/QF551/EVAL ® E . . . | 27% | 288/294 | 290/295 |

[1]QF551 = adhesive (G)

EXAMPLE II

As stated above, some random copolymers of propylene and ethylene could be improved in terms of stiffness at retort temperatures. Mineral fillers have been used to increase the stiffness as measured by flexural modulus (0.05 in/min). Table 4 gives the physical property data for two different kinds of polypropylene, (PP 5225 and PP 5384) and two different random copolymers filled with different percentages of two different mineral fillers, Huber WG-1 mica and Pfizer RX-3252 surface treated talc.

The flexural modulus in lbs/in² has been measured at 73° F., 250° F., 260° F. and 270° F. It can clearly be seen by reviewing Table 4 that the use of mica or talc in the random copolymers increases their flexural modulus at all temperatures.

TABLE 4

PHYSICAL PROPERTY DATA FOR MINERAL FILLED RANDOM COPOLYMERS

| Base Resin | Filler % | Type[1] | Melt Flow Rate | Flexural Modulus (0.05 in/min) 73° F. (psi) | 250° F. (psi) | 260° F. (psi) | 270° F. (psi) | 73° F. Notch. Izod (ft-lb/in) | 32° F. Gardner Impact (ft-lb) |
|---|---|---|---|---|---|---|---|---|---|
| PP5225 | 0% | | 0.7 | 176,010 | 26,210 | | 20,240 | 0.7 | 9 |
| PP5384 | 0% | | 2.0 | 189,160 | 24,921 | 25,455 | 21,026 | 0.8 | 3 |
| WRS6-148 | 0% | | 2.0 | 131,320 | 12,456 | 9,161 | 8,758 | 1.5 | 9 |
| WRS6-148 | 25% | WG-1 | 1.8 | 277,270 | 26,800 | 20,005 | 15,648 | 1 | 3 |
| WRS6-148 | 34% | WG-1 | 1.4 | 338,460 | 37,958 | 24,209 | 20,247 | 0.8 | 4 |
| WRS6-148 | 39% | WG-1 | 1.0 | 355,470 | 36,438 | 28,270 | 26,761 | 0.6 | 3 |
| WRS6-148 | 27% | 3252 | 2.0 | 254,460 | 28,753 | 20,097 | 18,736 | 0.8 | 8 |
| WRS6-151 | 0% | | 4.5 | 105,460 | 9,638 | 6,326 | 5,283 | 0.9 | 9 |
| WRS6-151 | 22% | WG-1 | 4.2 | 244,080 | 17,391 | 11,770 | 8,870 | 0.8 | 3 |
| WRS6-151 | 31% | WG-1 | 2.2 | 295,550 | 24,024 | 15,767 | 14,992 | 0.7 | 3 |
| WRS6-151 | 38% | WG-1 | | 347,970 | 27,583 | 22,748 | 15,360 | 0.6 | 3 |
| WRS6-151 | 39% | WG-1 | 2.0 | 355,530 | 30,073 | 22,890 | 15,505 | 0.6 | 3 |
| WRS6-151 | 25% | 3252 | 4.0 | 226,330 | 20,386 | 15,519 | 12,064 | 0.7 | 8 |
| WRS6-151 | 33% | 3252 | 3.1 | 265,290 | 23,072 | 18,728 | 13,065 | 0.7 | 7 |

[1]WG-1 = Huber Mica - no surface treatment.
3252 = Pfizer RX-3252 - surface treated talc.

Table 3 shows the results of similar experiments wherein a barrier layer, EVAL ®E, was included as part of the laminate which was formed. Again, 4 oz. cups were formed from a 50 mil sheet. Even though the barrier layer has a melting point somewhat higher than that of the polypropylene, the barrier layer does not have any apparent effect on the sheet distortion temperature. Again, the use of the random copolymer layer substantially decreases the sheet distortion temperature and broadens the forming window. The data shown in Tables 2 and 3 have been plotted in graph form to more dramatically illustrate the forming window. FIG. 2 is a graph of the sheet surface temperature versus the percentage of polypropylene in the polypropylene/random copolymer composite. The shaded area is the forming

EXAMPLE III

The experiments discussed herein were carried out on an Illig 3710 continuous former which allows thermoforming under conditions similar to commercial operation. The radiant oven temperature in the continuous former was 715° F. In these experiments, the amount of distortion was determind by measuring the amount of cup shrinkage. 6 oz. cups were formed and the volume capacity of the cup before and after being subjected to retort conditions was measured. If the shrinkage was more than 8% the cup was judged to fail.

The 6 oz. cups were formed from different sheet constructions in a manner similar to that used in Example I. A pass fail determination was made on the basis of 6% shrinkage. They were plotted in graph form as shown in FIG. 3. It can be seen that the sheet distortion temperature curve is similar to the curve in FIG. 2 and that the maximum forming temperature range occurs when the hardskin or polypropylene layer is 20% or less of the overall polypropylene/random copolymer composite.

EXAMPLE IV

The procedure of Example III was duplicated except that the 6 oz. cups were made on the lab former used in Example I. The data were plotted in graph form and shown in FIG. 4. The results are similar to those shown in FIGS. 2 and 3.

I claim:

1. A process for thermoforming a sheet or billet, comprised of at least one outer layer of polypropylene and at least one adjacent layer of a random copolymer of propylene and ethylene in which propylene is the major component, into rigid articles which do not significantly distort under retort conditions, which comprises forming the sheet or billet at a temperature at which the polypropylene layer is in the solid phase below its sticky point and the copolymer layer is in the melt phase, said temperature being above the highest temperature at which the copolymer layer will not be able to prevent stress relaxation in the polypropylene layer from causing significant distortion of the articles under retort conditions.

2. The process of claim 1 wherein the thickness of the copolymer layer is at least four times the thickness of the polypropylene layer.

3. The process of claim 1 wherein a mineral filler is incorporated into the copolymer layer.

4. The process of claim 3 wherein the mineral filler is selected from the group consisting of mica, talc, clay and calcium carbonate.

5. The process of claim 1 wherein the sheet or billet also includes a layer of a barrier material.

6. The process of claim 5 wherein the barrier material is an ethylene vinyl alcohol copolymer.

7. A process for thermoforming a sheet or billet, comprised of at least one outer layer of polypropylene, at least one layer of a random copolymer of propylene and ethylene in which propylene is the major component and at least one layer of a barrier material, into rigid articles which do not significantly distort under retort conditions, which comprise forming the sheet or billet at a temperature below the sticky point of the polypropylene layer and above the highest temperature at which the copolymer layer will not be able to prevent stress relaxation in the polypropylene layer from causing significant distortion of the articles under retort conditions.

8. The process of claim 7 wherein the thickness of the copolymer layer is at least four times the thickness of the polypropylene layer.

9. The process of claim 7 wherein a mineral filler is incorporated into the copolymer layer.

10. The process of claim 9 wherein the mineral filler is selected from the group consisting of mica, talc, clay and calcium carbonate.

11. The process of claim 7 wherein the barrier material is an ethylene vinyl alcohol copolymer.

* * * * *